AVERAGE COMPUTING DEVICE

Filed Aug. 14, 1950 2 Sheets-Sheet 1

Inventor
Clyde S. Mundell
By Clarence A. O'Brien
and Harvey B. Jacobson
Attorneys Inventor
Clyde S. Mundell By Clarence A. O'Brien
and Harvey B. Jacobson
Attorneys Patented Oct. 20, 1953 2,656,100

UNITED STATES PATENT OFFICE 2,656,100

AVERAGE COMPUTING DEVICE

Clyde S. Mundell, Carmichaels, Pa.

Application August 14, 1950, Serial No. 179,280

7 Claims. (Cl. 235—61)

This invention relates to computing means, and more particularly to devices equipped for computing averages, and it has for its main object to provide a computer of simple construction capable of computing the average values of a relatively large number of given values, which is of simple construction, which provides clear indications easily readable without entailing errors, and which device may be manipulated by persons without previous training in this field.

It is a further object of the invention to provide a computer for average values having a setting disk on which the values to be averaged may be set one after the other by moving said disk through a predetermined angle, proportional to the value to be set, which setting disk is connected with an average indicator moved by the setting disk, which average indicator brings the average value into display within an appropriately arranged indicator window.

A further object of the invention is to provide an average indicator having an average indicator disk with a plurality of average indicating zones displayed through an appropriately arranged window, the operative zone of the average indicator disk being selected by a movable indicator advanced from zone to zone during the selection of the values to be averaged.

It is a further object of the invention to provide an average indicator having a dialing disk for selecting the values to be averaged, said dialing disk having preferably the shape of a circular dial provided with holes, which is moved angularly to an extent determined by the selected dialing hole which corresponds to the value selected, and further having an average indicator disk with a plurality of annular zones carrying average values, coupled for rotation by means of gear wheels with a dialing disk, and further having a movable indicator frame adapted to slide radially along a section of the average indicator disk for marking the average value thus far obtained by the dialing of the selected values, said indicator frame being moved automatically by the operation and under the control of the dialing disk.

Further and more specific objects of the invention will be apparent from the following detailed specification.

The invention is illustrated in the accompanying drawings, showing one embodiment thereof by way of example. It is, however, to be understood that the example shown is intended to illustrate the principle of the invention and the best mode of applying said principle, but that it is not intended to give a complete survey of all the modes of application.

The computing device according to this invention essentially comprises a dialing plate or disk, moved over an arc which is proportional to the values which have to be averaged and which forms a basis of the average calculation, an average indicator plate or disk carrying the indicia which furnish the desired average value, said indicia being placed on a number of annular bands or zones on said disk, and a movable indicator mechanism which selects the correct band or zone on which the value will appear and which indicates the value on the zone, and finally a top and a bottom plate, the former being provided with a display window or slot in which the result of the operation appears. The two plates also hold and enclose the entire mechanism.

Figure 2:
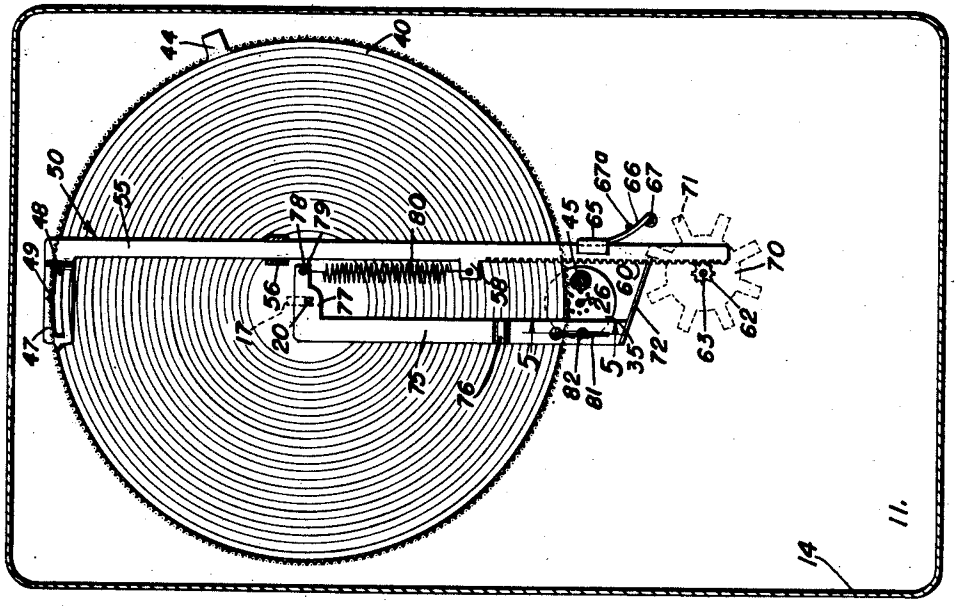
Figure 2 is a plan or face view of said computing device with the top plate removed, the back plate being shown in this case in the shape of a flat box, the side walls of which are shown in section.
Figure 1:
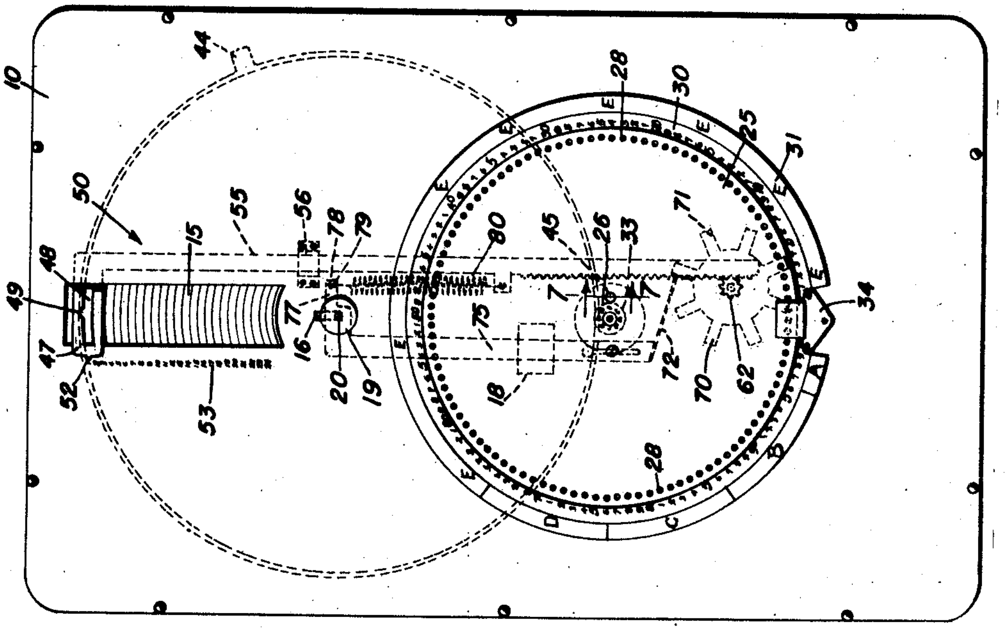
Figure 1 is a plan or face view of the computing device.
Figure 7:
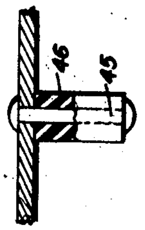
Figure 7 is a sectional elevational view of the stop member for the averaging indicator disk.
Figure 3:
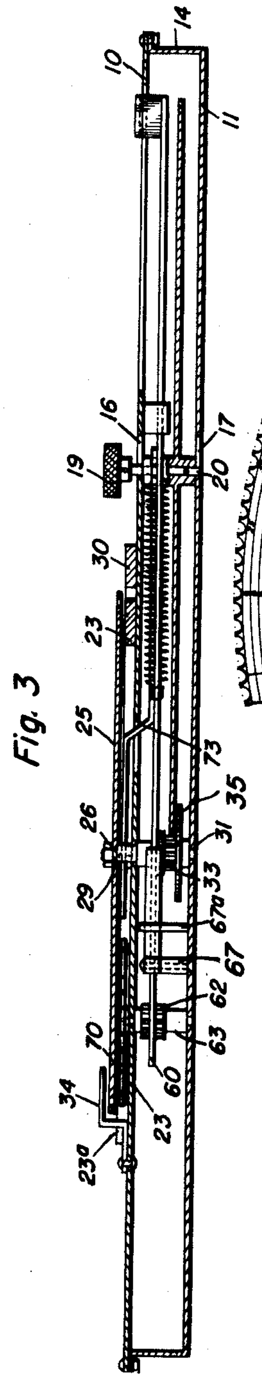
Figure 3 is an elevational sectional side view of the computer, the section being taken along the plane of symmetry passing through the center of the two disks.

As will be seen from Figures 1 and 3, the entire mechanism is held on and between the front or top plate 10 and the rear plate or back 11, the latter plate being shown as having marginal upstanding walls 14 so as to form a flat box which may be fixed to the top plate 10.

However, if it is found that the complete enclosing of the mechanism increases the weight unduly, merely front and rear plates held at a distance by spacers may be used, while the enclosing of the mechanism to protect it against dust may be obtained by a paper, plastic, or textile marginal strip running along the edge and fixed by an adhesive.

The front plate 10, as best seen in Figure 1, is provided with a longitudinal indicator window 15, behind which a portion of the average indicator disk 40 is displayed. Below the window, a slot 16 is arranged in which the spindle 20 of the average indicator disk 40 is journaled. Moreover, a further opening 18 is provided in the front plate, the purpose of which will be explained below.

The rear plate 11 has a slot 17 facing the slot 16 of the front plate for taking up the other end of the spindle 20 of the average indicator disk 40. Moreover, both plates 10 and 11 are provided with a number of holes in which axles, pins, and other members of the mechanism described below are journaled or held.

On top of the front plate, as best seen in Figures 1 and 3, the dialing or setting disk 25 is mounted which consists preferably of a circular plate or disk which is fixedly mounted on an axle or shaft 26 and is held by means of a nut or the like, which disk is provided along its periphery with a series of holes 28, each hole corresponding to a given predetermined value.

Figure 8:
Figure 8 is a view of the stylus which may be used in connection with the dialing disk.

Into the holes, a stylus 24 may be inserted which, in the example shown in Figure 8, merely consists of a coil or wire with a helical winding at its end, which winding may serve for fixing the stylus to a handle or pencil.

If it is assumed, by way of example, that percentages are the values the average of which has to be determined, then the number of holes will be around 100, as shown in Figure 1, but it is clear that the number of holes depends on the averaging operation to be performed. The number of holes shown in the drawing is 104, 100 holes being usable for dialing, while three holes are covered behind other parts to be described below and cannot be used for this purpose. Moreover, a further hole or a corresponding space must be provided in order to permit a sufficient spacing of the first hole from the zero position.

The scale indicating the values to be associated with the dialing holes 28 is marked on a suitable scale plate 30 surrounding the dialing disk 25. A plurality of such scale plates 30, 31 may be provided, permitting the use of the computer for averaging different kinds or types of values, the outer scale being, in this case, indicated by a letter scale, with letters A, B, C, D . . . each letter indicating a unit, which units may have different values and may be differently colored in order to facilitate the manipulation.

Below the dialing or setting disk 25 a flat supporting ring 23 is mounted which supports the edge of the disk and which provides a surface on which a stylus which has been inserted into one of the holes 28 of the disk 25 may slide. This ring is provided with a depression 23*a* for accommodating a ratchet wheel which is described below.

As mentioned above, the stylus is inserted into one of the holes in order to rotate the disk. To limit such rotation, a stop 34 is mounted at a convenient point on the front plate 10 which covers the marginal part of the dialing or setting disk 25 provided with the holes 28, which arrests the movement of the disk when rotated by means of the stylus. The disk is therefore moved through a predetermined angle when the stylus is inserted into a hole 28 facing a definite value on the scale plate 30.

The shaft 26 on which the dialing or setting disk 25 is mounted carries a pinion 33 which meshes with teeth 38 on the toothed rim of the average indicator disk 40. The pinion is preferably provided with a flange or a retaining disk 35 mounted on the shaft 26 in order to prevent axial relative displacement of the pinion and of the toothed rim of the disk 40. The latter disk is mounted between the front and the rear plates 10 and 11 on the spindle 20 which is movable within the slots 16 and 17 of said front and rear plates, respectively. Obviously, therefore, when the dialing or setting disk 25 is rotated, the average indicator disk 40 will be rotated with it and will be moved angularly in proportion to the ratio between the diameters of pinion 33 and the toothed rim 38 of disk 40, the ratio shown in the drawing being 1 to 25.

The spindle 20 of the average indicator disk 40 carries at its end a knob 19 by means of which the spindle may be shifted within the slot and may also be rotated by hand.

Figures 4, 5, 6:
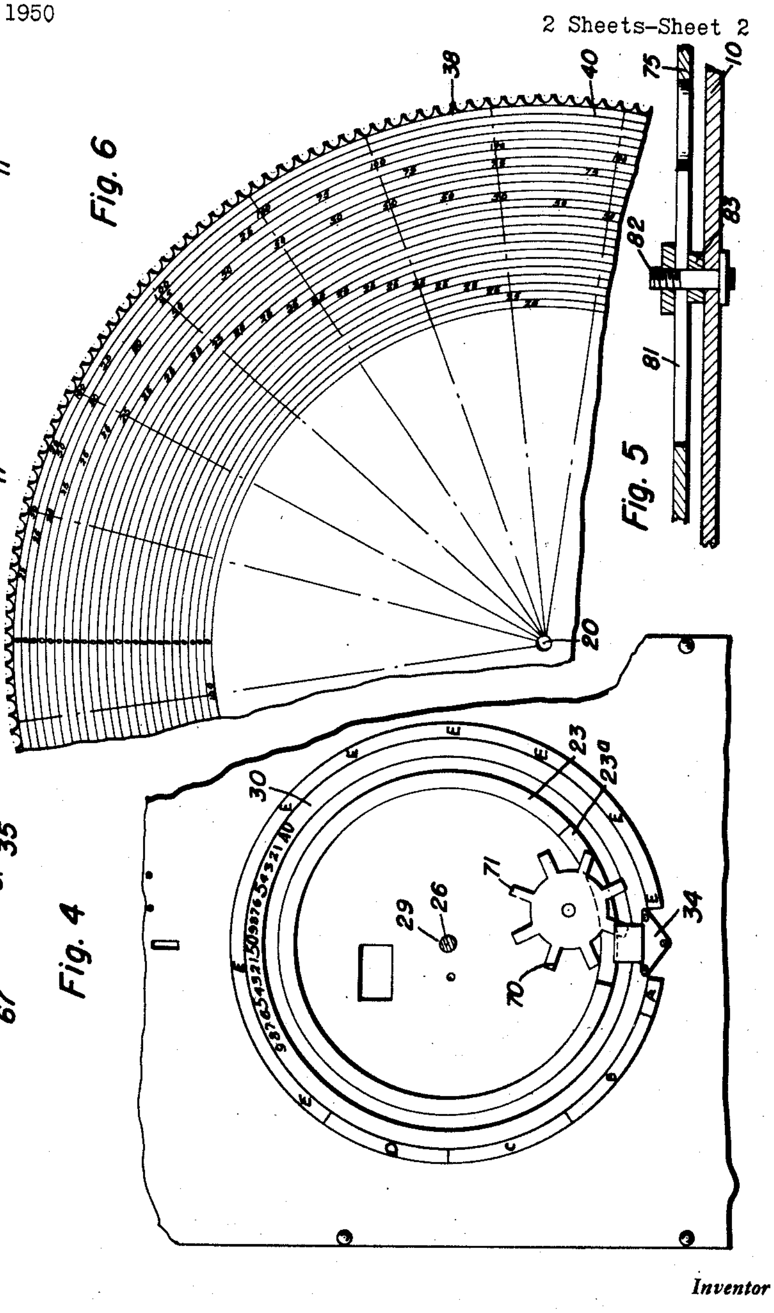
Figure 4 is a fragmentary plan view of the lower portion of the computing device which carries the dialing plate or disk, which plate or disk, however, is removed in order to show the structure below the said disk which is arranged on top of the front plate.
Figure 5 is a fragmentary elevational and sectional view of a detail, the section being taken along the longitudinal axis of the guiding slot marked by the line 5—5 of Figure 2.
Figure 6 is a fragmentary front view of the average indicator disk.

The average indicator which is carried by the disk 40 may be printed or engraved on the disk or may consist of a separate sheet which is attached to the disk. This indicator comprises a number of annular bands or zones which is equal to the number of units the average value of which has to be computed. When a new value is added to the group of units which have to be averaged, the new average value will be found on a new band or zone of the indicator. For instance, if the average of four values is to be found, the result will be found on the fourth annular band, and likewise if the average of twenty values has to be found, the average value will be on the twentieth annular band or zone. The figures which represent the average values are placed along said annular band or zone, as indicated by the Figures 25, 50, 75 and 100 which are shown in Figure 6. The figures indicating the result of the computing operation are displayed through the window 15 of the top of front plate 10.

As seen in Figure 1, a section of all the bands or zones on the indicator is displayed and a scale may therefore be arranged along one of the edges of the window 15 which permits the location of a definite zone or band which has to be read.

The average indicator disk 40 is moreover provided with a stop member 44 which may be arrested by a stop pin 45 mounted on the front plate 10 and projecting therefrom. The stop pin 45 may be surrounded with a resilient rubber cylinder 46 for cushioning the impact. The stop 45 is preferably located in front of pinion 33 and acts as a guard preventing the stop 44 from hitting the pinion.

In order to indicate clearly the result of the average computation, a movable indicator 50 is provided which comprises an indicator frame 47 with a reading opening 48 and a mark 49 pointing to the exact value which indicates the result. This indicator frame 47 moves along the window 15 and its reading opening is part of an annulus which uncovers and encircles a part of one of the annular bands or zones of the average indicator. The window may be provided with a suitable reading lens.

The indicator frame 47 may, moreover, be provided with a pointer 52, cooperating with the scale 53 which is arranged along the edge of the window 15 on the upper or front plate 10 and which indicates the serial number of the band or zone on the indicator disk on which the reading is made.

The movable indicator 50 further comprises an indicator bar 55 to which the frame 47 is attached in order to move the latter radially along the window 15. The indicator bar 55 is held and guided by a guide member 56 which is fixedly mounted on the upper or front plate 10. Moreover, the bar is provided with a projecting lug 58 for a purpose which will be described below, and its end forms a rack 60, the teeth of which mesh with the pinion 62 mounted on a shaft 63. The shaft 62 is again journaled in suitable holes of the front and rear plates 10 and 11.

A sliding pressure piece 65 is mounted on the end of a leaf spring 66 and is therefore applied against the back of the rack 60. The leaf spring is held by a pin 67 and by applying pressure to the sliding pressure piece 65 it holds the rack in its correct position with respect to guide 56 and to pinion 62.

The shaft 63 projects beyond the front plate and on said projecting portion carries a ratchet wheel 70 with a number of ratchet arms or teeth 71 which cooperate with the spring 72 preventing movement of the ratchet wheel in one direction. The ratchet wheel 70 and the spring 72, while mounted above the front plate 10, are located below the dialing disk 25 and are covered by said disk. Moreover, the ratchet wheel is so placed with respect to disk 25 that one of its teeth or arms 71 projects into the circle formed by the holes 28 arranged along the circumference of the disk 25 so that a stylus, such as the stylus 24, when passing through one of the holes and when moved toward the stop 34, will engage said arm 71 and will thus advance the ratchet wheel through an angle corresponding to the angle or distance between two teeth 71.

The ratchet spring 72 is mounted on a release control bar 75 which is arranged in substantial parallelism to the indicator bar 55 and which is stepped, as shown at 76 in Figure 3, so that its upper portion is located between the two plates 10 and 11, while its lower portion is located above the front plate, the connecting stepped portion 76 passing through the opening 18 in the front plate 10.

The upper end of the release control bar 75 has a transversely arranged head section 77 with a journaling hole for the spindle 20, the end 78 of which is provided with a hole 79 into which the end of a coil spring 80 may be hooked. The other end of the spring 80 is fastened to the lug 58 of the indicator bar 55.

Near the other or lower end of the release control bar 75 a guiding slot 81 is provided in said bar through which a guiding pin 82 held by the front plate 10 projects. Said pin may carry a suitable nut sliding on the release control bar 75 and also holding the said bar applied against a supporting washer 83 (Figure 5).

It will thus be seen that the release control bar 75 may be moved up and down, the pin 82 sliding within the slot 81 guiding the bar during such movement. This up and down movement has to be performed under the influence of the spring 80 as the latter is held at its end which is attached to the lug 58 of the indicator bar 55. This longitudinal movement of the release control bar permits an up and down movement of the spindle 20 within the slots 16 and 17.

In order to operate the averaging mechanism, the operator first seizes knob 19 and lifts the spindle 20 against the tension of spring 80 and rotates the average indicator disk while the spindle is lifted in the slot until stop 44 is arrested by the stop pin 45. The knob may then be released.

In this position, the average indicator disk 40 will be in its zero position and the figure 0 will be displayed in the first or outermost annular band under the mark 49.

The above described preliminary operation must only be performed if the operator who manipulated the device previously has not returned the average indicator disk to its zero position.

The average operation may now start by setting the values to be averaged by means of the stylus 24 which is inserted into the hole of the dialing disk 25 corresponding to the value which has been selected by means of the scale 30 or the scale 31. The dialing or setting disk 25 is rotated by means of the stylus until the latter is arrested by the stop 34.

This dialing operation produces a definite angular movement of the dialing disk 25 and thereby also a definite angular movement of the shaft 26 and the pinion 33. The average indicator disk 40, the teeth 38 of which mesh with the pinion 33, is thereby rotated to an extent corresponding to the said angular movement of the dialing disk.

When the stylus 24 has been inserted into a hole 28 of the dial 25, the end of the stylus projects on the lower side of the dial to a limited extent. This projecting end of the stylus engages the arms 71 of the ratchet wheel 70 which projects into the path of the stylus when the latter nears the stop 34 and the ratchet wheel is thereby advanced for one tooth, the spring 72 now engaging the next tooth or arm and again holding the same against rotation in one direction. This rotation of the ratchet wheel 70 is transmitted to the shaft 63 and pinion 62 whereby the rack 60 is advanced for a number of teeth which corresponds to a radial movement of the indicator bar 55 from one annular band or zone to the next.

During this movement, the indicator bar 55 is guided by the guide 56 and also by the sliding pressure piece 65 which is pressed against the rack by the leaf spring 66. The leaf spring may be tensioned to the desired extent by means of a tensioning pin 67a.

As the average indicator disk 40 has been moved through a certain angle, as described, and as the frame 47 of the indicator 50 has been moved to the correct band or zone, the mark 49 of the frame 47 will now indicate the correct average value, averaging those values which have been set so far on the dial. The number of values which has been set is indicated by the pointer 52 which slides along the scale 53.

The number of values the average of which has to be computed may vary in any manner from operation to operation and this number is only limited by the number of bands or zones which have been placed on the average indicator disk 40 and by the maximal rotation which may be imparted to the disk 40 in those cases in which no cyclic repetition occurs.

When reading of the average value has been performed, the device is reset as above described by lifting the knob 19 and by turning said disk 40 until it is again in its zero position. The lifting of the spindle 20 also lifts the release control bar 75 and disengages the spring 72 from the ratchet wheel. The spring 80 returns the bar 55. The pinion 62 and the ratchet wheel 71 rotate freely during this operation.

It will be clear that the way in which average values are set on the bands or zones of the average indicator disk will vary with the type of averaging operation which has to be performed, with the dimensions, the ratio of the gears, etc. However, the figures indicating the average values are always set in accordance with a definite geometrical pattern which has to be found and which may easily be calculated. The indicator disk 40 may be provided with means for changing the sheet on which the average values have been marked. Such an interchangeable sheet has the advantage that different averaging operations may be carried out with one and the same device.

It will be clear that changes of a non-essential nature may be made in all the details without departing in any way from the essence of the invention as defined by the annexed claims.

Having described the invention, what is claimed as new is:

1. An average computing device comprising a dialing disk provided with holes for the insertion of a stylus, the values to be averaged being set by moving the stylus inserted into a hole of the dialing disk from a selected position into a predetermined end position, a gear wheel connected with said dialing disk, an average indicator disk provided with concentric annular zones containing average value scales and provided with gear teeth engaging the gear wheel of the dialing disk, a front plate with a radial display window for displaying a radial section of said average indicator disk, a radial scale along one of the sides of the said radial display window, a sliding indicator adapted to slide radially along said average indicator disk in said display window, said indicator having a head provided with a slot encompassing a section of one of said annular zones, and with a mark for indicating a specific value within the said section, and stylus operated means for advancing said indicator head radially one step upon each angular movement of the dialing disk, said means being operated by the projecting end of the stylus inserted into a hole of the dialing disk when the latter is moved into its predetermined end position.

2. An average computing device comprising a rotatable dialing disk provided with a series of circumferential holes for the insertion of a stylus for setting the values to be averaged by angularly moving the disk for each value through an angle which is proportional to the said value and which brings the stylus into a predetermined end position, a scale surrounding said disk for allocating specific values to each of said holes, an average indicator disk provided with concentric annular zones containing scales of average values, a gear wheel transmission between said dialing disk and said average indicator disk, a front plate provided with a radial display window for displaying a radial section of said average indicator disk, a sliding indicator adapted to slide radially along said average indicator disk in said display window, said indicator including an indicating head with a slot displaying a section of one of the zones of the average indicator disk, and an indicator bar carrying said indicator head, means for advancing said indicator bar step by step said means including a rack held on said indicator bar, a ratchet wheel in close proximity to the dialing disk provided with ratchet arms, arranged in the path of the stylus inserted into the hole of the dialing disk operated when the latter is rotated through an angle bringing the stylus into its predetermined end position, and means for locking said advancing means after each step.

3. An average computing device comprising a rotatable dialing disk provided with a series of circumferential holes for the insertion of a stylus, for setting the values to be averaged by angularly moving the disk for each value through an angle which is proportional to the said value and which brings the stylus into a predetermined end position, a scale surrounding said disk for allocating specific values to each of said holes, an average indicator disk provided with concentric annular zones containing scales of average values, a front plate provided with a radial display window for displaying a radial section of said average indicator disk, a sliding indicator adapted to slide radially along said average indicator disk in said display window, said indicator including an indicating head with a slot displaying a section of one of the zones of the average indicator disk, and further including an indicator bar carrying said head provided with a rack, a ratchet wheel provided with ratchet arms in close proximity to the dialing disk, said arms projecting into the path along which the circumferential holes are moved, and thereby being engaged and moved by a stylus inserted into a hole of the dialing disk and rotating the latter, a spring holding the ratchet wheel against rotation in one direction, a release bar carrying said spring, a further spring joining said release bar and said indicator bar, and manual means for moving said release bar against the action of said further spring.

4. An average computing device comprising a rotatable dialing disk provided with a series of circumferential holes for the insertion of a stylus for setting the values to be averaged, a scale surrounding said disk indicating the values assigned to the angular position of each hole, a stop near the periphery of said disk, for stopping the rotation of the dialing disk when rotated by means of a stylus inserted into a hole in a fixed position, a ratchet wheel provided with ratchet arms, one of said arms projecting into the path described by the holes in the dialing disk and thereby engaged by a stylus inserted into one of said holes, said ratchet wheel being so placed that an arm, when moved, produces a definite angular movement of said ratchet wheel, a gear wheel connected with said ratchet wheel, a shaft carrying said ratchet and gear wheel, a front and a rear plate journalling said shaft, said dialing disk and ratchet wheel being positioned on top of the said front plate, an average indicator disk provided with a number of concentric annular zones carrying average value indications, a shaft carrying said disk, a gear transmission between said dialing disk and said average indicator disk, a stop on said last-named disk for bringing the same into a predetermined starting position, a fixed stop on one of said plates cooperating with the stop on the disk, said front plate being provided with a radial display window displaying a radial section of the average indicator disk and said front and rear plates being provided with slots for journaling the shaft of the average indicator disk, a knob on said shaft for moving the same within the slot, a release bar with a head journaling the shaft of the average indicator disk, said release bar carrying a spring locking the ratchet wheel, and a sliding indicator moved within the radial window and along the average indicator disk and driven by the gear wheel connected with said ratchet wheel.

5. An average computing device as claimed in claim 4 wherein the sliding indicator is provided with an indicator bar carrying a rack engaging the gear wheel connected with the ratchet wheel, guiding means for said indicator bar and a spring fixed to said indicator bar and to the head of the release bar.

6. An average computing device as claimed in claim 5 in which the release bar is provided with a guiding slot, and a guiding pin entering said slot and fixed in one of said plates.

7. An average computing device as claimed in claim 4 in which the front plate is provided with an additional window, and in which the release bar has a stepped configuration and passes through said window, the end of the release bar carrying the head being located between the front and rear plates and the other, locking spring carrying end being located on top of the front plate.

CLYDE S. MUNDELL.

References Cited in the file of this patent

UNITED STATES PATENTS

| Number | Name | Date |
|---|---|---|
| 1,023,961 | Quivey | Apr. 21, 1912 |
| 1,765,697 | Palmer et al. | June 24, 1930 |
| 2,499,237 | Veatch et al. | Feb. 28, 1950 |

FOREIGN PATENTS

| Number | Country | Date |
|---|---|---|
| 466,101 | Great Britain | May 19, 1937 |